United States Patent Office 2,880,162
Patented Mar. 31, 1959

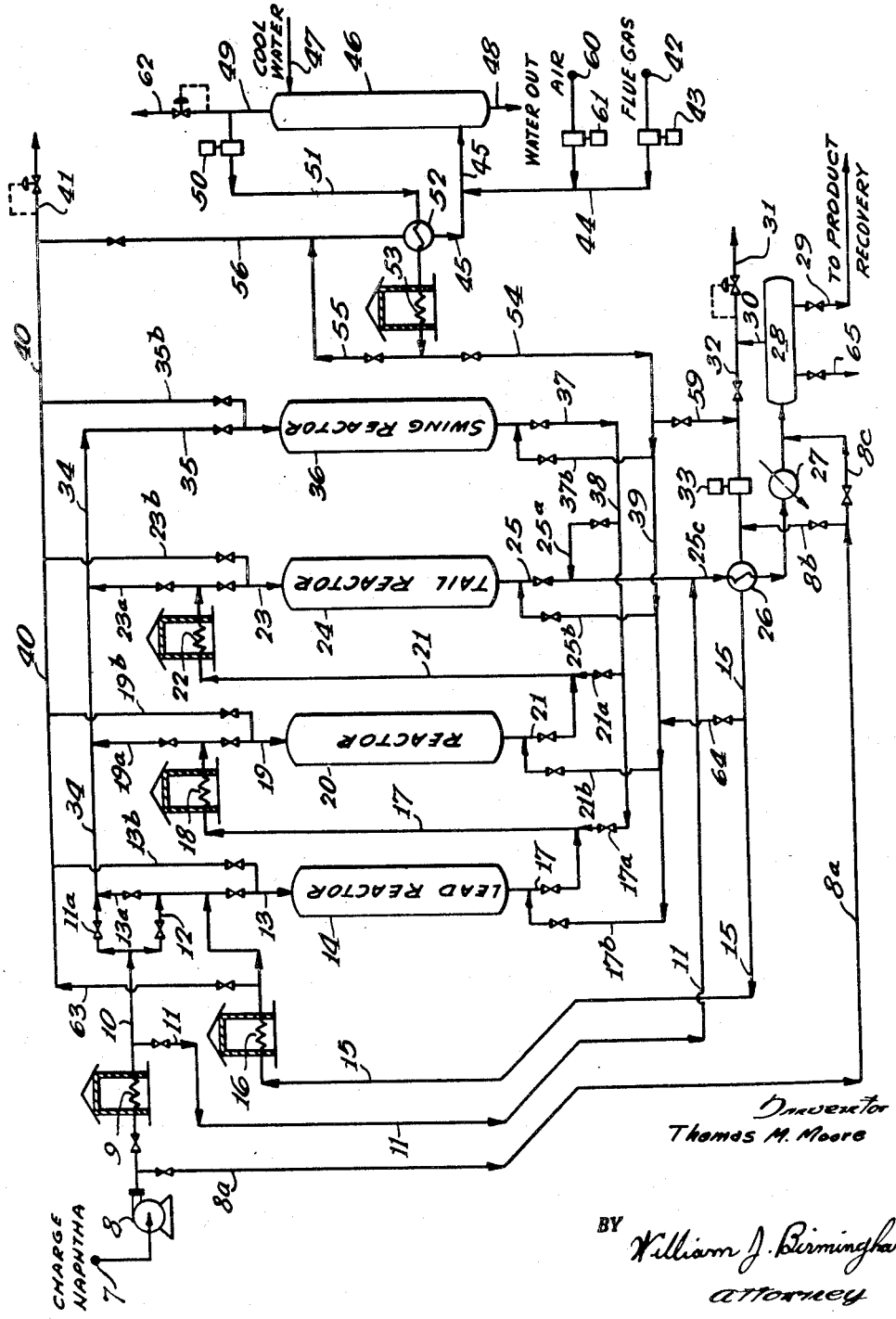

2,880,162

START-UP PROCEDURE FOR REGENERATIVE PLATINUM CATALYST HYDROFORMERS

Thomas M. Moore, Munster, Ind., assignor to Standard Oil Company, Chicago, Ill., a corporation of Indiana Application June 22, 1956, Serial No. 594,078

10 Claims. (Cl. 208—65)

This invention relates to an improved start-up procedure for a regenerative platinum catalyst hydroforming system, and it pertains more particularly to a method for internally producing and purifying the start-up gas.

The start-up of a platinum catalyst hydroformer requires considerable care in order to avoid catalyst deactivation. Heretofore, it has been considered necessary to purge reactors with inert gas, i.e. flue gas, prior to introducing the start-up gas. Moreover, it has been considered essential to employ extraneous sources of start-up gas, such as, bottled hydrogen, bottled nitrogen, or normally gaseous hydrocarbons, e.g. natural gas. The start-up gas must also be substantially free of carbon oxides and water which quickly deactivate platinum catalyst under hydroforming conditions. Even when the extraneous start-up gas is free of carbon oxides and water, repeated purging and/or evacuation of the reactors with start-up gas are necessary because of the surprisingly extensive contamination of the start-up gas with carbon oxides desorbed from the catalyst and reactor internals. Such procedures are, of course, troublesome and expensive. An object of this invention is to provide a start-up procedure for regenerative platinum catalyst hydroforming systems, as exemplified by Ultraforming, which does not require purging with inert gas prior to introducing the start-up gas. Another object is to provide a start-up procedure which minimizes deactivation of platinum catalyst from carbon monoxide poisoning. Another object is to provide a start-up procedure which does not require the use of extraneous start-up gases and which, at the same time, does not require installation of additional equipment. A further object is to provide a start-up procedure which does not require repeated purging and evacuation of the reactors with start-up gases prior to on-stream operation and which, at the same time, does not cause significant catalyst deactivation. A further object is to provide a start-up procedure which will minimize loss of promoter components from the catalyst and will minimize corrosion problems. Another object is to provide a start-up procedure which will avoid formation of heat-fronts or hot-spots during initial periods of on-stream operation. Other objects will be apparent as the detailed description of the invention proceeds.

A regenerative platinum catalyst hydroforming system, as exemplified by Ultraforming (Petroleum Engineer, vol. XXVI, No. 4, April 1954, at page C–35), includes a reaction side comprising lead, intermediate, and tail reactors, heating zones prior to each of these reactors, a gas separation zone after the reactors, and compressor and lines for recycling separated gas. In addition, the system includes a regeneration side comprising sources of flue gas and air, a scrubbing or contacting zone, such as a water spray tower, whereby water is removed from regeneration gases, a circulator and lines whereby flue gas may be circulated through the scrubbing zone, and valved lines for connecting the regeneration side to the reaction side when platinum catalyst in a reactor requires reactivation. In brief, in practicing my invention, this hydroforming system is brought on-stream by purging the reaction side with air, instead of the usual flue gas, and then displacing air from the reaction side with substantially pure nitrogen obtained by scrubbing contaminants from flue gas in the contacting zone of the regeneration side. With substantially pure nitrogen as the start-up gas, the reaction side is then brought on-stream in a manner which avoids catalyst deactivation, as hereinafter described in detail.

To start-up a unit in accordance with my invention, a supported platinum catalyst is charged to each of the reactors. The entire system is then purged at about atmospheric pressure, e.g. 5–10 p.s.i.g., at a temperature below about 200° F. and pressured to at least the desired operating pressure to check for possible leaks. The reaction side is preferably purged and pressured with air, the regeneration side may advantageously be connected with the reaction side and purged and pressured at the same time with air or may be purged and pressured separately with air or flue gas. After pressure testing, the reaction side is purged with air at less than about 500° F., e.g. about 200° to 300° F., and preferably at a pressure below about 100 p.s.i.g., e.g. about 20 to 30 p.s.i.g., until purge gases exiting from the reaction side show essentially no trace of carbon oxides, e.g. preferably below about 0.1 mol percent carbon oxides, thereby indicating substantially complete desorption of carbon oxides from the catalyst and reactor linings.

The purge air may be introduced to the reaction side from the regeneration side air source, after which purge the regeneration side may be isolated from the reaction side. Alternatively, the purge air may be introduced directly into the reaction side at, for instance, the inlet of the recycle gas compressor. With the regeneration side isolated from the reaction side, air is purged from the regeneration side with flue gas and after purging, the regeneration side is pressured to the full operating pressure, e.g. about 350 p.s.i.g. Flue gas at such pressure is circulated through the contacting zone of the regeneration side, that is, the water spray tower, until the carbon oxides content of the circulating flue gas is reduced by absorption in the contacting medium to less than about 1 mol percent, preferably less than about 0.5 mol percent. At this point the contacted flue gas is essentially pure nitrogen.

The scrubbing or contacting medium for removing carbon oxides is preferably water. Other suitable contacting media include mono-, di-, and tri-ethanol amines, potassium phosphate, potassium carbonate, activated charcoal, zeolites, and other materials capable of removing carbon oxides. The time required for reducing carbon oxides to desired levels in the case of a water spray tower is much greater than that required for removing water and sulfur. It depends on many factors, including temperature of the water, concentration of carbon oxides, pressure, efficiency of contact, and relative volume of water as compared with the volume of gases being contacted. Gas absorption data for carbon oxides in water are presented in the Chemical Engineers' Handbook, third edition, McGraw-Hill, page 674. Suitable chemicals, such as potassium or sodium hydroxide, may be included in the aqueous medium to increase solubility of carbon oxides therein, although this is not considered essential. In a typical commercial Ultraforming system it has been found that the regeneration water scrubbing tower without any additive will reduce the carbon dioxide content of the flue gas from about 14% to less than 1.0 mol percent in less than about 5 hours.

With air in the reaction side at about atmospheric pressure, or preferably less, e.g. 0–5 p.s.i.g. or less, and essentially pure nitrogen in the regeneration side at full operating pressure or higher, e.g. about 350 p.s.i.g. or higher, valved lines between the two sides are opened. Because of its much higher pressure, nitrogen flows from the regeneration side into the reaction side, thereby diluting the air and equalizing the pressure in both sides. The system is then depressured and the regeneration side again isolated from the reaction side. This procedure for diluting and displacing the air in the reaction side is repeated until the oxygen content of the diluted gases in the reaction side is reduced below about 1 mol percent, preferably below about 0.5 mol percent.

Alternatively, to minimize the time required to reduce the oxygen content in the reaction side to safe levels, e.g. below about 1 mol percent, the air in the reaction side may be evacuated prior to diluting the reaction side with nitrogen from the regeneration side. If after releasing nitrogen into the reaction side from the regeneration side the oxygen content in the reaction side is still above desired levels, the whole system may be evacuated, the regeneration side isolated, and essentially pure nitrogen again produced in the regeneration side at high pressure and introduced into the reaction side as previously outlined.

The number of times that this procedure for reducing the oxygen content in the reaction side must be repeated depends on the particular design of the system, including the relative volume of the reaction side as compared with the regeneration side, the operating pressure of the unit, and whether or not evacuation facilities for the reaction side are provided. In a typical commercial Ultraforming unit having four reactors, including a swing reactor, and operating at an average pressure of about 300 p.s.i.g., the procedure for diluting and displacing oxygen from the reaction side must be repeated for a total of three times to reduce oxygen content to safe levels. In this unit the volume of the reaction side is about six times that of the regeneration side. If on this same unit the gases are evacuated by means of a steam jet evacuator prior to purging the reaction side with nitrogen from the regeneration side, the oxygen content in the reaction is reduced to safe levels after just one purging.

Upon completion of this procedure for removing oxygen, the reaction side contains essentially pure nitrogen at a pressure of about 50 p.s.i.g., the exact pressure depending, of course, on the particular design of the unit. The nitrogen is now recycled through the reaction side while simultaneously being heated to dry the catalyst and reactor internals and to reach start-up temperatures. To expedite this heating step a pressure higher than 50 p.s.i.g. is usually preferred. The desired pressure, e.g. about 200 p.s.i.g., may be reached simply, now that the oxygen content has been reduced to a safe level, by pressuring the reaction side with carbon-oxides-free flue gas, i.e. nitrogen, produced in the regeneration side. Recycled gas, leaving the tail reactor, may be cooled to about 100° F. and condensed water removed in the gas separation zone. The amount of water in the gas circulating through the catalyst beds should be below 5 mol percent and preferably below 1 mol percent. Aqueous condensate thus removed may be corrosive and it should be withdrawn.

When the catalyst beds have been heated to about 700° to 800° F. by the recycled gas stream and substantially all water has been removed from the system, the pressure in the system may be reduced substantially below 200 p.s.i.g., e.g. about 30–150 p.s.i.g. Naphtha charge may then be slowly introduced. The catalyst bed in either the swing reactor or one of the regular reactors may be raised to a somewhat higher temperature of about 750° to 800° F., usually not higher than about 800° F. while the remaining reactors may be maintained at a somewhat lower temperature of about 700° to 750° F. A preferred operation is to connect the swing reactor in tail reactor position so that while substantially pure nitrogen is being circulated in the rest of the system, naphtha preheated to about 750° to 800° F. is introduced directly into the swing reactor and the effluent therefrom is discharged directly through heat exchangers to the hydrogen separator. The hydrogen thus formed in the swing reactor is recycled through the whole system and its concentration in the recycled gas rapidly reaches 80 percent or more. When the hydrogen pressure reaches the desired level, e.g. about 200 p.s.i.g., or more, the incoming naphtha charge at about 800° F. transfer line temperature is cut into the first reactor for on-stream flow through regular on-stream reheaters and reactors. The catalyst in the on-stream reactors is thus protected by hydrogen initially generated in the swing reactor. As soon as the system is brought to the desired pressure of operation, e.g. about 300 p.s.i.g., the temperature of the initial heater and reheaters is increased from about 800° F. to about 850° to 1000° F., e.g. about 920° F., and the system is thus gradually brought to one-stream operating conditions.

By initially operating at relatively low hydrogen partial pressure, i.e. about 200 p.s.i.g. or lower, and relatively low temperature, i.e. not more than about 800° F., any tendency toward formation of run-away heat-fronts or hot-spots due, apparently, to hydrocracking is minimized. Any carbon deposited on the catalyst during initial generation of hydrogen is limited to the catalyst in the swing reactor since hydrogen produced in the swing reactor will be adequate to prevent appreciable carbon formation in the remaining reactors when charge is introduced thereto. The swing reactor may then be cut out of the system, the catalyst therein may be regenerated, if needed, and the other reactors will remain on-stream without necessity for regeneration for a much longer period of time than would otherwise be possible.

By using air rather than flue gas, for the initial purging and pressure testing, the start-up procedure is greatly simplified. In addition, contact of the catalyst with carbon monoxide, a known poison for platinum and often present in flue gas, is minimized. Moreover, air purging removes carbon oxides adsorbed on the catalyst instead of adding additional carbon oxides, which must subsequently be removed before on-stream operation. While carbon dioxide, which is usually in flue gas in concentrations of 10 percent or more, does not significantly deactivate platinum catalyst, as soon as it contacts hydrogen generated by reforming reactions it is reduced to carbon monoxide which does poison the catalyst. The importance of removing carbon oxides desorbed from the catalyst has been pointed up repeatedly by commercial experience. For instance, in one commercial Ultraformer an essentially pure start-up gas became contaminated with about 5 to 10 percent carbon oxides which were desorbed from platinum catalyst during heating. Attempted start-up under such conditions resulted in complete failure and deactivation of all catalyst beds.

By using scrubbed flue gas, i.e. nitrogen, for drying the system and establishing circulation and initial preheating conditions, catalyst activity is protected. By maintaining the moisture content of circulating gases below about 5 mol percent, loss of promoter components of the catalyst is minimized. By initiating the introduction of charging stock at low temperature and low pressure, carbon formation on the catalyst is minimized.

The invention will be more clearly understood by reference to the following example read in conjunction with the accompanying drawing which is a schematic flow diagram of an Ultraforming system in which my start-up procedure is particularly advantageous.

In normal operation of an Ultraforming system a naphtha charge such, for example, as the 150 to 360° F. fraction of a Mid-Continent virgin naphtha is introduced from source 7 by pump 8 through preheater 9 and transfer line 10 from which the preheated charge may be by-passed by line 11 to the product recovery system during start-up procedure. In on-stream operation transfer line 10 will discharge through lines 12 and 13 to reactor 14 along with recycled hydrogen from line 15 which is preheated in heater 16. Effluent from reactor 14 passes through line 17, reheater 18, and transfer line 19 to reactor 20. Effluent from reactor 20 passes through line 21, reheater 22, and transfer line 23 to tail reactor 24. It should be understood that more than three reheater-reactor stages may be employed in the system.

Effluent from the tail reactor flows through lines 25 and 25c, heat exchanger 26 and cooler 27 to separator 28 from which hydroformed product is withdrawn through line 29 to a stabilizer and/or conventional product recovery system. A part of the hydrogen withdrawn from the separator through line 30 may be vented through line 31 but usually about 1,000 to 10,000 cubic feet per barrel of charge is recycled through line 32 by means of circulating compressor 33 to line 15.

Transfer lines 11a, 13a, 19a and 23a may be selectively connected to header 34 for discharging through line 35 to swing reactor 36, the effluent from which passes through line 37 to header 38 and thence through line 17a to line 17, line 21a to line 21, or line 25a to line 25. During normal on-stream operation without the swing reactor the valves in lines 11, 11a, 13a, 13b, 17a, 17b, 19a, 19b, 21a, 21b, 23a, 23b, 25a and 25b remain closed and the valves in lines 12, 13, 17, 19, 21, 23 and 25 remain open.

The swing reactor may be substituted for the lead reactor by opening valves in lines 13a, 35, 37 and 17a and closing valves in lines 13 and 17. Alternatively, it may be substituted for intermediate reactor 20 by opening valves in lines 19a, 35, 37 and 21a and closing the valves in lines 19 and 21. The swing reactor may take the place of the tail reactor by opening valves in lines 23a, 35, 37 and 25a and closing valves in lines 23 and 25. It will thus be seen that each of the reactors may be taken off-stream for regeneration and replaced by the swing reactor and that, alternatively, the swing reactor may be connected to operate in parallel with any of the other on-stream reactors during periods when no regeneration is required.

In some Ultraforming systems the hydrogen-rich recycle gas and the naphtha charge are heated in the same preheater. In such systems the charge introduced by pump 8 may be introduced by lines 8a and 8b to line 15 just ahead of heat exchanger 26 during normal operation and may be introduced by line 8a and line 8c to the line entering separator 28 during start-up.

Each of the reactors is provided with a refractory lining of low iron content, and metal surfaces may preferably be aluminized. They may each contain about the same amount of catalyst although, if desired, the subsequent reactors may contain somewhat more catalyst than the initial reactors. The catalyst may be of any known type of supported platinum catalyst, and the platinum is preferably supported on alumina. It may be prepared by compositing a platinum chloride with an alumina support as described, for example, in U.S. Patent 2,659,701, and it preferably contains about .3 to .6 weight percent of platinum.

The on-stream pressure is usually below about 400 p.s.i.g., i.e. in the range of 200 to 350 p.s.i.g. The inlet temperatures to each reactor are usually in the range of about 850 to 1000° F., e.g. about 920° F., and may be approximately the same for each reactor although it is sometimes desirable to employ somewhat lower inlet temperature to the initial reactor than to the remaining reactors. The overall weight space velocity may be in the range of about .1 to 4 pounds of naphtha per pound of catalyst per hour. There is, of course, a pressure drop in the system so that the lead reactor may operate at about 50 to 100 p.s.i. higher pressure than the tail reactor.

Prior to regeneration hot hydrogen-rich gas for stripping hydrocarbons from catalyst in a blocked-out reactor may be introduced by line 63 to manifold line 40 and thence through one of lines 13b, 19b, 23b, or 35b to the selected reactor. Also, hydrogen-rich gas may be introduced from line 15 to manifold line 39 by line 64.

For effecting purging and regeneration of the catalyst in any bed, purge gases and regeneration gases may be introduced through manifold line 39 and a selected one of lines 17b, 21b, 25b and 37b. Such purge and regeneration gases may be selectively withdrawn through lines 13b, 19b, 23b and 35b to manifold line 40 from which gases may be vented or flared through line 41. Purge and regeneration gases from manifold line 39 may be introduced to the inlet of circulating compressor 33 by line 59.

Flue gas from source 42, which typically contains about 9 to 12 percent carbon oxides, about 18 to 14 percent water, and about 73 to 74 percent nitrogen, may be introduced to the system by compressor 43 and passed by lines 44 and 45 through a contacting zone 46 which is preferably a scrubbing tower into which cool water is introduced through line 47 and from which water is withdrawn through line 48. The scrubbed flue gas withdrawn from the top of the tower through line 49 is passed by compressor 50 through line 51, heat exchanger 52, heater 53, and line 54 to manifold line 39 when it is desired to introduce flue gas into the system for purging and/or regeneration. By closing the valve in line 54 and opening the valve in line 55, the flue gas may be recirculated through lines 55 and 56, heat exchanger 52 and line 45 back to the scrubber. Air may be introduced from source 60 by compressor 61 for effecting purging and/or pressuring of the system, and regeneration and/or regeneration-rejuvenation of the catalyst. Excess flue gas may be vented from the system by line 62.

In starting up this system in accordance with my invention the entire system is, of course, first checked for mechanical defects, cleaned out, dried, and the reactors are charged with catalyst. A layer of alumina balls is preferably placed on top of each of the catalyst beds to prevent swirling of the catalyst pellets which might otherwise lead to abrasion and production of catalyst fines. Air from source 60 is next introduced into the system and passed via 61, 44, 45, 46, 49, 50, 51, 52, 53, 54, 39 and 59 to the inlet of circulating compressor 33; and it is thereafter passed through all of the heaters, transfer lines and reactors, the air being at this time purged from the system through line 31. The temperature of the air during this purge may be below about 200° F. and the pressure is preferably about atmospheric, i.e. about 5 to 10 p.s.i.g.

After the initial air purge, the system is pressured with air to at least the desired operating pressure, e.g. to about 350 p.s.i.g., to check for possible leaks. After pressure testing, the system is depressured by opening the valve in line 31. Air may continue to be introduced to the system from source 60 and vented from the system via line 31. Alternatively, however, the reaction side may be isolated from the regeneration side by closing valve in line 54, the valve in line 56 also being closed. Air may then be introduced into the reaction side, preferably at the inlet to recycle gas compressor 33, and vented from the reaction side via line 31. The air should be circulated through the reaction side at a temperature below about 500° F. e.g. about 200–300° F. and preferably at a pressure below about 100 p.s.i.g., e.g. about 20–30 p.s.i.g. until the gas exiting from line 31 shows essentially no trace of carbon oxides, e.g. preferably below about 0.1 mol percent carbon oxides. Carbon oxides content of this gas may be determined by Orsat analysis or by other convenient means. Alternatively, to avoid the necessity of analyzing exiting gases, the temperature of the circulating air may be raised to about 450° to 500° F. and circulated from about .1 to 1 hour. At such temperature essentially all adsorbed carbon oxides will have been desorbed from the catalyst and carried away by the circulating gases.

With the regeneration side isolated from the reaction side by closing valve in line 54, the valve in line 56 also being closed, air may be purged from the regeneration side with flue gas from source 42, the purged gas exiting from the regeneration side via line 62. After purging, the valve in line 62 is set to hold back a pressure at least as high as the operating pressure, e.g. about 350 p.s.i.g. Flue gas introduced from source 42 is then circulated via 43, 44, and 45 to the contacting tower 46 and is recirculated back to contacting tower 46 via 49, 50, 51, 52, 53,, 55, 56, 52, and 45. Carbon oxides in the circulating flue gas are dissolved out by a water spray in contacting tower 46, the water being introduced via line 47 and exiting via line 48. When the carbon oxides content of the contacted flue gas is below about 1 mol percent, preferably below about 0.5 mol percent, at full operating pressure, introduction of flue gas from source 42 is discontinued.

With air in the reaction side at essentially atmospheric pressure or less, e.g. about 5 to 10 p.s.i.g. or less, and contacted flue gas, i.e. essentially pure nitrogen, in the regeneration side at full operating pressure or more, e.g. about 350 p.s.i.g. or more, the valve in line 54 is opened so that the nitrogen gas flows from the regeneration side into the reaction side, thereby substantially diluting the air. The entire system is depressured to atmospheric via line 31. The regeneration side is again isolated from the reaction side by closing the valve in line 54; flue gas is introduced into the regeneration side from source 42 and, as before, circulated through contacting tower 46 at full operating pressure until the carbon oxides level is again reduced below about 1 mol percent, preferably below about 0.5 mol percent. With essentially pure nitrogen again present in the regeneration side at full operating pressure, valve in line 54 is again opened and nitrogen again introduced to dilute and displace oxygen in the reaction side. This procedure is repeated until the oxygen content in the reaction side is below about 1 mol percent, preferably about 0.5 mol percent.

Alternatively, if the system is equipped with means for evacuating the reaction side, air from the reaction side may be evacuated to as low a pressure as possible prior to introducing nitrogen from the regeneration side. If after introduction of nitrogen from the regeneration side the oxygen content in the reaction side is still above safe maximum levels, e.g. about 1 mol percent, the system is again evacuated and the procedure repeated until the oxygen level is at least below 1 mol percent.

With essentially pure nitrogen in the reaction side and the regeneration side isolated from the reaction side, the nitrogen is recycled through the reactors and lines by recycle gas compressor 33, the swing reactor 36 preferably being connected in parallel with the tail reactor 24 at this time. Temperature of the recycled gas is raised by firing heaters 16, 18, and 22. Water in the recycled gases is condensed in cooler 27 and separated in separator 28 from which it may be withdrawn through line 65, the valve in line 29 being closed at this time. The heating up of a reactor should be sufficiently slow up to about 300° F. so that the gas will not pick up more than 5 mol percent water. After this initial drying step the temperature may be increased more rapidly to about 700° to 750° F., and circulation continued at this temperature until no further appreciable amounts of water are removed from gas separation zone 28 via line 65. To expedite heating of the reaction side, the pressure of the recycled gas, i.e. nitrogen, may be increased by introducing additional nitrogen produced in the regeneration side as before. Since the oxygen content in the reaction side at this point is below safe maximum levels, no depressuring or evacuation should be used.

With essentially pure nitrogen being recycled through the reaction side, the valve in line 65 is closed and the valve in line 29 is opened. Naphtha preheater 9 is fired and charge naphtha preheated to about 800° F. is introduced through by-pass line 11 (the valves in lines 11a and 12 being closed) directly to product effluent line 25c from which it passes through exchanger 26, cooler 27, separator 28, and line 29 to the product recovery system for establishing operating conditions therein. If a single preheater is employed, naphtha charge is introduced at this time to the separator through lines 8a and 8c, the valve in line 8b being closed. The pressure of the hot circulating nitrogen stream, if it is not already below about 200 p.s.i.g., should next be reduced to as low a pressure as is feasible, preferably to a pressure in the range of about 30 to 150 p.s.i.g., by adjustment of the pressure control valve in line 31. The lower limit on pressure is usually dictated by the minimum suction pressure of the recycle gas compressor. As low a pressure as feasible is desired from a process standpoint so that the partial pressure of hydrogen will increase as rapidly as possible, once naphtha is charged.

The catalyst in one of the reactors is preferably heated to about 750° to 800° F. and the naphtha which is introduced into this reactor is preheated to about the same temperature so that the generation of hydrogen will largely be accomplished in a single vessel. When the swing reactor is employed for hydrogen generation and all catalyst beds have been heated to about 700° to 750° F. by circulating scrubbed flue gas, i.e. nitrogen, the valve in line 23 may be closed, the valve in line 23a being opened, and the temperature of heater 22 increased to provide a transfer line temperature of about 800° F. so that the swing reactor is thus heated to about 750° to 800° F. Next, with the pressure in the circulating nitrogen system below about 200 p.s.i.g. and preferably in the range of 30 to 150 p.s.i.g., the valves in lines 11a and 23 are opened, while valves in lines 11, 12 and 13a are closed, naphtha vapors preheated to approximately 800° F. are introduced directly through lines 34 and 35 to the swing reactor while recycled gases are continuously circulated through heater 16, reactor 14, heater 18, reactor 20, heater 22 and reactors 24 and 36 (in parallel), the temperature of these heaters at this time being increased to bring the temperature of the lead and intermediate reactors up to about 800° to 850° F.

The hydrogen generated by dehydrogenation in the swing reactor will quickly increase the hydrogen concentration of the recycled gas to about 80 percent or more and the pressure in the system may be increased by the generated hydrogen to the desired operating pressure. As soon as the circulating gas stream is at least about 80 percent hydrogen, the valve in line 12 is opened and the valve in line 11a is closed so that the charge preheated to about 800° F. is now cut into the hot circulating hydrogen stream. The transfer line temperatures of heaters 9, 16, 18 and 22 may now be increased to the desired level, e.g. about 900° to 920° F. and if the operating pressure has not already been attained, it may quickly be attained in this on-stream operation. Thus, carbon deposition on the lead, intermediate, and tail reactors is substantially avoided by starting up with hydrogen produced in the swing reactor. If and when regeneration of the catalyst in the swing reactor is desired, the valve in line 35 is closed and sufficient hot hydrogen is available for stripping hydrocarbons therefrom via lines 63, 40 and 35b, after which the valves in lines 63, 37, and 25a are closed.

By gradually increasing temperature and pressure during this start-up procedure, the danger of encountering preliminary heat-fronts or hot-spots (apparently caused by undesired hydrocracking) may be avoided. Since gases are continuously being circulated through the reactors, reheaters and transfer lines while hydrogen is displacing nitrogen, there will be no abrupt temperature changes in any part of the system.

Instead of employing the swing reactor for initially generating hydrogen, the lead reactor, the tail reactor or in fact any of the on-stream reactors may be preheated to a temperature of about 750° to 800° F. by raising the temperature of the appropriate heater and the system may be brought on-stream by introducing charging stock at about 700° F. to all of the reactors except the preheated reactor for which the start-up inlet temperature is preferably about 750° to 800° F. With this method of start-up, line 11a is not required and the preheated naphtha may be introduced to line 13 and reactor 14 via transfer lines 10 and 12 when a separate preheater 9 is employed or may be introduced via lines 8a, 8b, and 15 when hydrogen and naphtha are preheated in the same heating coil.

In this embodiment one reactor, e.g. the swing reactor, is preferably blocked out during the initial start-up and the inlet temperatures to the reactors which are at about 700° to 750° F. should not be increased until the hydrogen concentration in the recycled gas is at least about 80 percent. When the circulating nitrogen has thus been essentially replaced by hydrogen and the pressure of the recycled gas has been increased to at least about 200 p.s.i.g., all transfer line temperatures may be increased to the desired operating level and any further increase in pressure may be built up so that on-stream operating conditions are fully established. In this case, the reactor which was operated at the initially high temperature and in which most of the carbon deposition has occurred may be cut out of the system for regeneration and replaced by the reactor which was initially blocked out.

The method of effecting catalyst regeneration will be described as applied to the swing reactor but it should be understood that the same procedure may be employed for any one of the other reactors when it is blocked out. When the charge inlet valve in line 35 is closed and while the valve in line 37 remains open, hot hydrogen is introduced by line 63 to manifold line 40 and thence through line 35b to strip out any hydrocarbons that may remain in the reactor, this stripped material being discharged through lines 37, 38, and 25a to line 25. Next, the valves in lines 63, 37, and 25a are closed and reactor 36 is depressured by opening the valve in line 41. Next, the reactor is purged to eliminate hydrogen therefrom by introducing flue gas from line 54, via lines 39 and 37b the purge gases being vented through lines 35b, 40 and 41. The temperature of the catalyst bed is adjusted to about 650° to 750° F. preparatory to initiating regeneration by circulating flue gas, under approximately the same pressure as that employed in on-stream processes, i.e. about 300 p.s.i.g., through the reactor by circulator-compressor 50. Heat, if necessary, is supplied to the circulating gas by heater 53. Next, controlled amounts of air are introduced from source 60 by compressor 61 into the circulating flue gas stream at a rate to effect combustion of carbonaceous deposits without exceeding a combustion zone temperature of about 1050° F. The hot flue gas leaving the reactor at about this temperature passes by lines 35b, 40 and 56 through heat exchanger 52 and thence through line 45 to scrubber 46 wherein the gas is scrubbed with cool water for condensing and eliminating most of the water formed by combustion of hydrocarbonaceous deposits. The net amount of flue gas production is vented from the system through line 62, the valve in which is set to maintain the desired back pressure of about 300 to 350 p.s.i.g. The cooled flue gas which is recirculated by circulator 50 may be further dried by passing through a desiccant bed (not shown) before it is returned through heat exchanger 52 to heater 53 which, during regeneration, maintains a transfer line temperature of approximately 700° F.

The transfer line temperature of heater 53 is increased to about 950° F. in order to reheat the catalyst bed to that temperature. If rejuvenation is required (and it usually is not required until the catalyst has been regenerated many times) the introduction of flue gas is stopped and the introduction of air is continued so that the catalyst is treated with a circulating air stream at a pressure of about 300 p.s.i.g. and a temperature of about 950° F. or more for a period of about one-half hour to twelve hours or more depending upon the extent of rejuvenation required. For rejuvenation sufficient air must be added so that the partial pressure of the oxygen is at least 0.4 atmosphere.

After the regeneration (or after rejuvenation if rejuvenation has been effected) the introduction of air is stopped, and flue gas is introduced from source 42 to purge oxygen from the swing reactor and from the regeneration system via line 62 until the oxygen content is reduced below about 1 mol per cent. After this high-pressure flue gas purge, the system is depressured by slowly opening the valve in line 41, and the purging may preferably be continued at atmospheric pressure to remove essentially all oxygen from the swing reactor and the regeneration system. After the flue gas purge, the flue gas may then be purged from the system with hydrogen-rich recycled gas introduced through lines 64, 39 and 37b. Preferably, to avoid heat front formation and reduction of carbon dioxide to carbon monoxide, the catalyst may be treated for 0.2 to 1 hour with a sulfur-containing non-reactive gas, e.g. methane containing 0.5 mol percent hydrogen sulfide, after the flue gas purge and prior to introducing hydrogen-rich recycled gas. The treating gas may be introduced from an outside source (not shown) into manifold 39 and then to swing reactor 36 via line 37b and vented via lines 35b, 40, and 41. After the recycled gas purge, the valve in line 37b is closed and the reactor is pressured with hot hydrogen introduced by lines 63, 40 and 35b. When the reactor is thus brought to the desired operating pressure, the valves in lines 63 and 35b are closed and the reactor may be placed on-stream by opening valves in lines 35 and 37.

While my invention has been described as applied to a particular Ultraforming system, it should be understood that it is applicable to other types of regenerative platinum catalyst hydroforming systems in which the regeneration facilities include means for removing carbon oxides. Various alternative arrangements and operating conditions will be apparent from the above description to those skilled in the art.

Having thus described my invention, I claim:

1. The method of starting up a regenerative platinum catalyst naphtha hydroforming system including a reaction side comprising lead, intermediate, and tail reactors, said reactors being at temperatures below about 200° F. prior to startup, heating zones, a gas separation zone, and compressor and lines for recycling separated gas, and including a regeneration side comprising a source of flue gas, a contacting zone wherein carbon oxides and water are removed from contacted gases, a circulator and lines for circulating gases, and valved lines for connecting said regeneration side with said reaction side, which method comprises purging said reaction side with air; displacing air from said reaction side by the procedure which comprises circulating flue gas through said contacting zone whereby carbon oxides are removed therefrom while increasing the pressure in said regeneration side substantially above the pressure in said reaction side, connecting said regeneration side and said reaction side whereby contacted flue gas flows from said regeneration into said reaction side and dilutes the air in said reaction side, depressuring, and isolating said regeneration side from said reaction side; repeating the steps of said procedure for displacing air from said reaction side until the oxygen content of the gas in said reaction side is below about 1 mol percent; recycling said gas through said reaction side while raising temperature to about 700° to 750° F.; introducing preheated naphtha charge stock at a temperature in the range of about 700° to 800° F. into said reaction side while the pressure of the recycled gas is in the range of about 30 to 200 p.s.i.g.; continuing the introduction of naphtha charge stock at a temperature in said range until the hydrogen concentration in recycle gas reaches about 80%, and then increasing the temperature of the naphtha charge to at least about 850° F.

2. The method of claim 1 wherein said reaction side is purged with air at about 450° to 500° F. until the carbon oxides content of the gases exiting from said reaction side is below about 0.1 mol percent.

3. The method of claim 1 wherein flue gas is circulated through said contacting zone until the carbon oxides content thereof is below about 1 mol percent.

4. The method of claim 1 which includes the steps of cooling the recycled gas leaving said tail reactor to condense water therefrom, and separating water from the recycled gas in said gas separation zone prior to introducing naphtha into said reaction side.

5. The method of claim 1 which includes the step of initially introducing preheated naphtha charge stock into a reactor which is at a higher temperature than the remaining reactors.

6. The method of claim 1 which includes the step of simultaneously increasing the pressure of the recycled gas while the hydrogen concentration thereof is being increased.

7. The method of claim 1 which includes the step of evacuating said reaction side after depressuring.

8. In a regenerative platinum catalyst naphtha hydroforming system including a reaction side comprising multiple reactors, said reactors being at temperatures below about 200° F. prior to startup, heating zones prior to each reactor, a gas separation zone after said reactors, and compressor and lines for recyling separated gas, and including a regeneration side comprising a source of flue gas, a contacting zone wherein oxides of carbon are removed from contacted gases, a circulator and lines for circulating gases and valved lines for connecting said regeneration side with said reaction side, the method of start-up which comprises purging said reaction side with air; circulating flue gas around said regeneration side at a pressure at least twice that in said reaction side whereby carbon oxides are removed therefrom in said contacting zone, repeatedly purging said reaction side with carbon oxides-free flue gas until the oxygen content of the gas in said reaction side is reduced below about 1 mol percent, recycling said gas through said reaction side at gradually increasing temperatures up to about 700° to 750° F. while removing from the recycled gas any water removed from the system by said gas, heating the catalyst in one of said reactors to a temperature in the range of about 750° to 800° F., introducing preheated naphtha charge into said reactor at a temperature in said range and at an initial pressure below normal operating pressure whereby dehydrogenation is effected and the hydrogen concentration in the recycled gas is increased, and increasing the temperature of the introduced naphtha to at least about 850° F. in all of the on-stream reactors after sufficient hydrogen has been built up in the recycled gas stream to substantially prevent carbon formation on the catalyst.

9. The method of claim 8 in which said contacting zone is a water spray tower.

10. The method of claim 8 in which the reaction side contains a swing reactor, which method includes the steps of initially passing preheated naphtha only through the swing reactor for providing a hydrogen build-up in the system and subsequently blocking out said swing reactor and regenerating catalyst therein.

References Cited in the file of this patent

UNITED STATES PATENTS

| | | |
|---|---|---|
| 2,284,603 | Belchetz et al. | May 26, 1942 |
| 2,335,610 | Plummer | Nov. 30, 1943 |
| 2,643,214 | Hartwig | June 23, 1953 |
| 2,654,694 | Berger et al. | Oct. 6, 1953 |
| 2,730,556 | Liedholm | Jan. 10, 1956 |
| 2,731,335 | Odell | Jan. 17, 1956 |
| 2,749,287 | Kirshenbaum | June 5, 1956 |
| 2,759,876 | Teter et al. | Aug. 21, 1956 |
| 2,773,013 | Wolf et al. | Dec. 4, 1956 |
| 2,773,014 | Snuggs et al. | Dec. 4, 1956 |
| 2,792,337 | Engel | May 14, 1957 |